Dec. 12, 1933.                W. O. WALLING                1,938,733
                                NUT CRACKER
                            Filed March 1, 1932        2 Sheets-Sheet 2
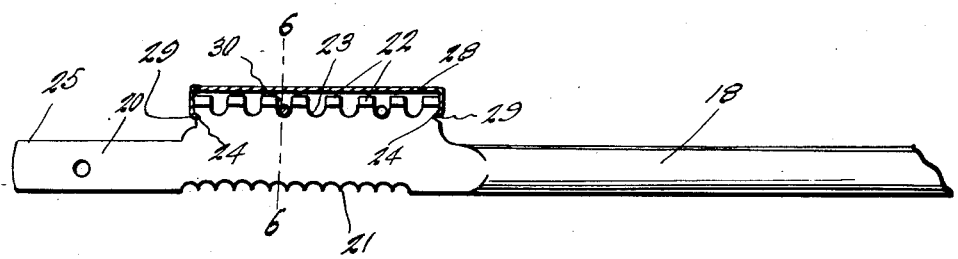
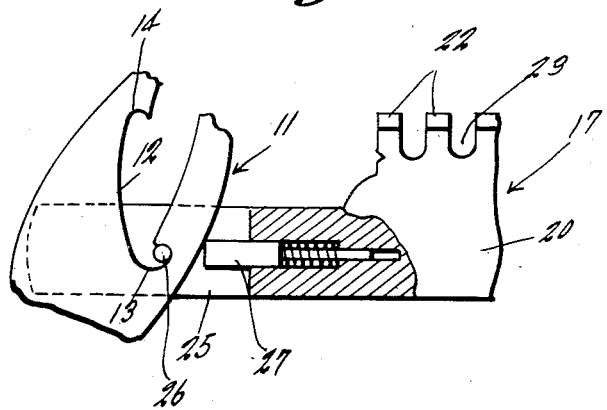
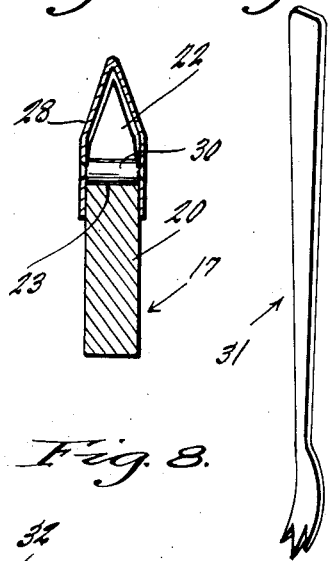
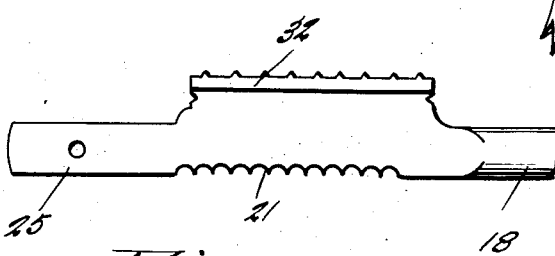
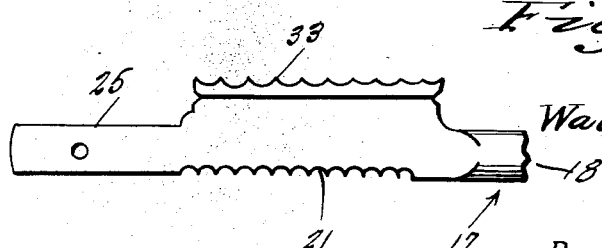
Inventor
Walter O. Walling
By Clarence A. O'Brien
Attorney Patented Dec. 12, 1933

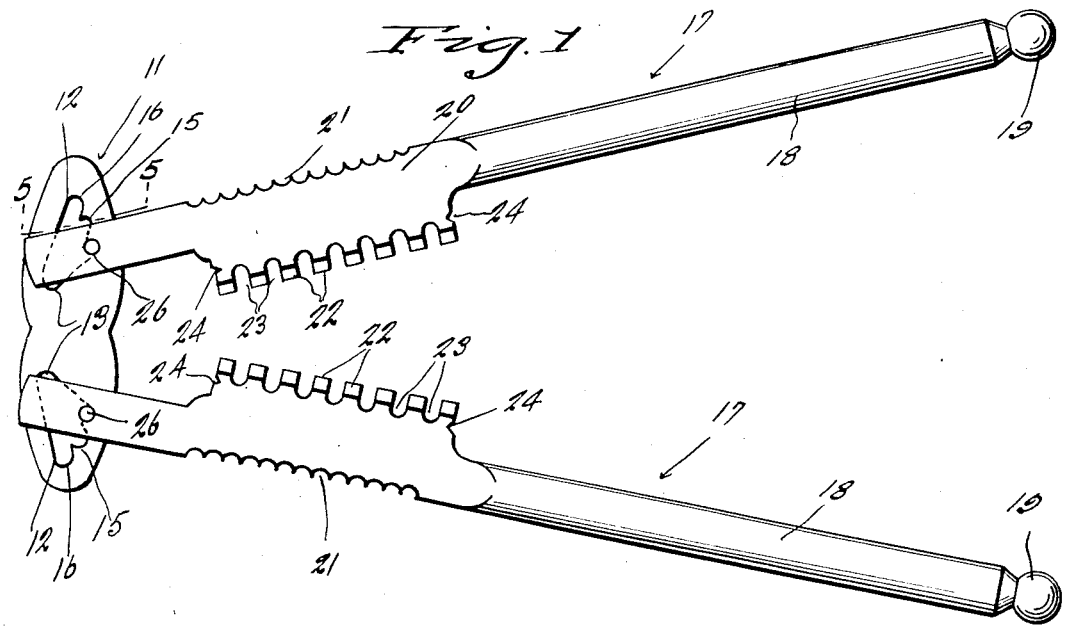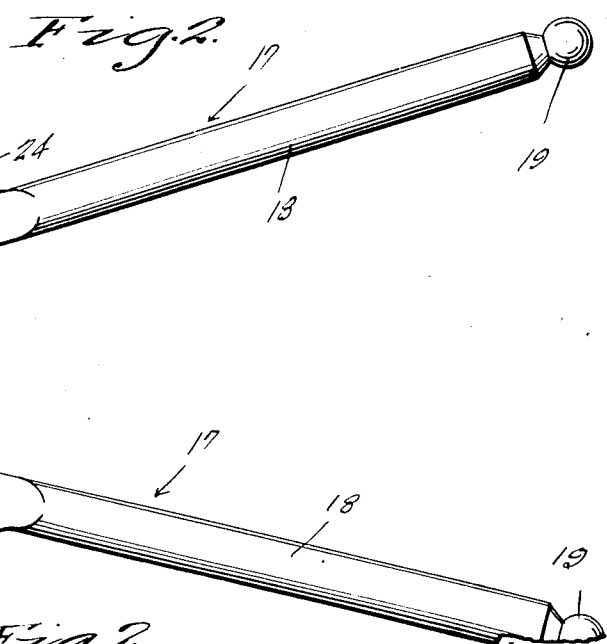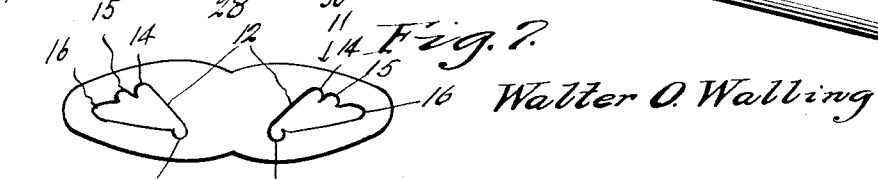

1,938,733

UNITED STATES PATENT OFFICE 1,938,733

NUT CRACKER

Walter O. Walling, Houston, Tex.

Application March 1, 1932. Serial No. 596,117

3 Claims. (Cl. 146—13)

This invention relates to an improved nut cracker and has more specific reference to a tool or implement of this class whose parts are reversible and interchangeable to provide an arrangement which permits fragmentary or piecemeal crushing, or clean-cut severing into halves.

The purpose of the invention is to provide a simple and economical nut cracker of a type wherein the parts are adjustable to accommodate different shapes, sizes and species, whereby to provide an implement of a highly desirable type because of its versatile characteristics.

The particular construction and association of parts will be clear upon considering the various views of the accompanying drawings in comparison with each other and in conjunction with the following description of figures and succeeding detailed description of parts.

In the accompanying drawings:

Figure 1 is an elevational view of the preferred embodiment or style of nut cracker constructed in accordance with the invention showing the manner in which the cutting teeth of the associated levers are used for halving nuts.

Figure 2 is a view like Figure 1 showing the parts reversed for conventional cracking acquired by crushing pressure.

Figure 3 is a view in section end elevation showing a removable guard for the cutting teeth.

Figure 4 is a fragmentary detail sectional and elevational view illustrating the spring pressure retaining device for the connector plate.

Figure 5 is a plan view of Figure 4.

Figure 6 is a cross section on the line 6—6 of Figure 3.

Figure 7 is a detail elevational view of the connector plate.

Figures 8 and 9 are views of cutters having differently shaped teeth.

Figure 10 is a perspective view of a nut meat pick.

The connecting plate denoted by the numeral 11 is somewhat elliptical in general plan view. It is provided at opposite ends with duplicate apertures 12 whose marginal portions are shaped to provide selectively usable keeper feet or notches. The inner ends of the apertures 13 are formed with notches 13 employed as seen in Figure 2 while the outer end portions of the apertures or slots are provided with three distinguishable notches 14, 15 and 16 which may be selectively used when the tool is employed as shown in Figure 1 in order to change the leverage and space between the companion levers 17.

Each lever is the same in construction and a description of one will suffice for both. The outer end of the lever is formed into a handle 18 which terminates in a knob 19. The opposite end is flattened as indicated at 20 and one longitudinal edge is serrated as at 21 while the opposite edge is formed with longitudinally spaced knife like cutting teeth 22 to an interference clearance notch 23. The numeral 24 designates retaining depressions which serve in a manner to be hereinafter described. The left hand end of the lever is bifurcated and the furcations are distinguished by the numerals 25 and are adapted to straddle the plate 11. These furcations are provided with a fulcrum pin 26 which may be seated in any of the notches 13, 14, 15 or 16 as desired and according to requirement.

It is evident that when the levers are adjusted to occupy the closely spaced converging relationship seen in Figure 2 the retaining and fulcrum pins 26 are seated in the notches 13 and at this time the serrations 21 are opposed to each other so that the tool may be used as a conventional nut cracker. By reversing the levers to occupy the position illustrated in Figure 1 it is permissible to place the pin 26 in any one of the keeper notches 14, 15 or 16 as desired and according to the lever and spacing required. At this time the teeth 22 are opposed to each other so that the tool may be employed for severing walnuts and pecans in substantially clean cut halves without crushing the shell. In either position I provide spring pressed plungers 27 which function as indicated in Figure 4 to press against the connector plate and to maintain the fulcrum pin properly seated.

The numeral 28 in Figures 3 and 6 designates a removable guard cover which is suitably shaped to fit down over the teeth to conceal the teeth. This guard has inturned portions 29 which function as detents and which snap into the depression 24 to hold the cover in place. The numeral 30 designates abutments which are seated in the notches 23 so as to limit the telescopic action of the cover and to prevent it from coming into contact with the cutting edges and dulling said edges. The cross sectional shape of this cover is better illustrated in Figure 6 of the drawings.

The numeral 31 in Figure 10 merely illustrates suitable picks for facilitating a removal of the nut meat after the nut has been slit or cracked as the case may be.

In Figures 8 and 9 I have shown different forms of cutting knives to take the place of the teeth 22 if desired. The type denoted by the numeral 32 in Figure 8 shows a different cross sectional shape and shape of teeth than that illustrated in Figure 9, by the numeral 33. These cutters are merely illustrated to give an idea that shape and proportion may be systematically varied according to the requirements.

The gist of the invention is in the provision of a pair of duplicate interchangeable and reversible levers and a substantially elliptical reversible connector plate capable of occupying the relative position illustrated in Figures 1 and 2 respectively; together with a spring pressed plunger projected between the furcations of the levers to hold the fulcrum pin in their respective accommodation seats or notches.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

Having thus described my invention, what I claim as new is:

1. A nut cracker comprising an elongated plate having its opposite end portion formed with duplicated diverging slots of approximate triangular configuration, the apices of said block being formed with fulcrum notches, and the outer end portion of the slot being provided with individually usable fulcrum notches, a pair of duplicate interchangeable and reversible levers provided with crushing and cutting means, the ends of the levers adjacent said plate being bifurcated and provided with retaining pins for selective reception in said notches, and spring pressed plungers carried by the levers and projection between the furcations and engageable with the adjacent edge portion of the plate for maintenance of the plate and fulcrum pin with respect to each other.

2. A nut cracker of the class described comprising a pair of duplicate levers, each lever having one end portion formed into a handle, having its opposite end portion bifurcated, said furcations being provided with a transverse fulcrum pin, spring pressed retaining plungers mounted in sockets in the levers adjacent said furcations and projecting between the furcations, the intermediate portions of the levers being of flat plate like cross section, one edge being serrated and the opposite edge notched and formed with longitudinally spaced cutting teeth, and a connector plate, the furcations of the levers being adapted to straddle said plate, the plate having its opposite end portion formed with apertures the marginal edges of which are provided with selectively usable notches in order to permit the levers to be reversed for the purposes stated.

3. A nut cracker of the class described comprising a pair of duplicate levers, each lever having one end portion formed into a handle, having its opposite end portion bifurcated, said furcations being provided with a transverse fulcrum pin, spring-pressed retaining plungers mounted in sockets in the levers adjacent said furcations and projecting between the furcations, the intermediate portions of the levers being of flat plate-like cross-section, said intermediate portions having one edge serrated and the opposite edge outstanding throughout its entire length as regards the plane of said handle and formed with notches and longitudinally spaced cutting teeth, a removable guard adapted to cover the said outstanding opposite edge, a connector plate, the furcations of the levers being adapted to straddle said plate, the plate having an opposite end portion formed with apertures the marginal edges of which are provided with selectively usable notches in order to permit the levers to be reversed for the purpose stated.

WALTER O. WALLING.